US009455793B2

(12) United States Patent
Griffin et al.

(10) Patent No.: US 9,455,793 B2
(45) Date of Patent: Sep. 27, 2016

(54) DIGITAL RADIO RECEIVER SYSTEM AND METHOD

(71) Applicant: Frontier Silicon Limited, Sawston, Cambridgeshire (GB)

(72) Inventors: Ivan Griffin, Clonmacken (IE); Daire McNamara, Limerick (IE); Billy O'Mahony, Tulla (IE); David O'Reilly, Sixmilebridge (IE); Darren Bane, Limerick (IE)

(73) Assignee: FRONTIER SILICON LIMITED, Cambridgeshire (GB)

( * ) Notice: Subject to any disclaimer, the term of this patent is extended or adjusted under 35 U.S.C. 154(b) by 0 days.

(21) Appl. No.: 14/273,300

(22) Filed: May 8, 2014

(65) Prior Publication Data

US 2014/0334576 A1 Nov. 13, 2014

(30) Foreign Application Priority Data

May 9, 2013 (GB) .................................. 1308376.1

(51) Int. Cl.
*H04N 7/16* (2011.01)
*H04L 12/66* (2006.01)
(Continued)

(52) U.S. Cl.
CPC ............. *H04H 40/18* (2013.01); *H04H 20/22* (2013.01); *H04H 20/62* (2013.01); *H04H 60/41* (2013.01)

(58) Field of Classification Search
CPC .... H04H 20/42; H04H 60/37; H04H 20/426; H04H 20/74; H04H 20/95; H04H 2201/60
See application file for complete search history.

(56) References Cited

U.S. PATENT DOCUMENTS 4,868,860 A * 9/1989 Andros ............... H04W 84/022 340/7.25
5,436,960 A * 7/1995 Campana, Jr. ........ H04L 12/589 455/412.1

(Continued)

FOREIGN PATENT DOCUMENTS

EP 1067719 1/2001
EP 2149997 2/2010

(Continued)

OTHER PUBLICATIONS

European Search Report dated Sep. 18, 2014 for European Application No. EP 14 16 7777, in 3 pages.

(Continued)

*Primary Examiner* — Daniel Washburn
*Assistant Examiner* — Sarah Hassan
(74) *Attorney, Agent, or Firm* — Knobbe Martens Olson & Bear LLP

(57) ABSTRACT

Provided is a digital radio receiver system and method for switching from receiving a first broadcast service to an alternative broadcast service. Also provided is a digital radio receiver system and method for scanning for broadcast services in a broadcast signal to generate an alternative broadcast service list for use in controlling the digital radio receiver system. A digital radio receiver utilizes spectrum awareness data, which includes data defining one or more frequencies at which broadcast services may be receivable, in order to faster selection of an alternative broadcast service from an alternative broadcast service list containing data relating to alternative broadcast services that are linked by a relationship to other broadcast services. By using the spectrum awareness data, only entries that are considered valid (i.e. entries that are determined to be alternative services that the receiver may receive) are retrieved from the alternative broadcast service list, which reduces the time taken for a receiver to switch to an alternative broadcast service from an initially received broadcast service.

48 Claims, 4 Drawing Sheets

(51) Int. Cl.

| | |
|---|---|
| ***H04H 40/18*** | (2008.01) |
| ***H04H 20/62*** | (2008.01) |
| ***H04H 20/22*** | (2008.01) |
| ***H04H 60/41*** | (2008.01) |

(56) References Cited

U.S. PATENT DOCUMENTS

| | | | | |
|---|---|---|---|---|
| 5,835,487 | A * | 11/1998 | Campanella | H04B 7/18523 370/316 |
| 6,351,643 | B1 | 2/2002 | Haartsen | |
| 6,985,467 | B2 * | 1/2006 | Lomp | H04B 1/707 370/335 |
| 7,020,111 | B2 * | 3/2006 | Ozluturk | G06F 13/374 370/335 |
| 7,779,154 | B2 * | 8/2010 | Lipsanen | H04N 7/17318 455/553.1 |
| 2002/0059626 | A1 * | 5/2002 | Lemmons | H04H 20/42 725/95 |
| 2002/0080895 | A1 | 6/2002 | Lindberg | |
| 2002/0097344 | A1 * | 7/2002 | Shibusawa | 348/731 |
| 2002/0180886 | A1 * | 12/2002 | Cook | H04N 5/4401 348/554 |
| 2003/0008651 | A1 * | 1/2003 | Trachtman | H04H 20/62 455/431 |
| 2003/0137964 | A1 * | 7/2003 | Suenaga | H04B 7/18526 370/342 |
| 2004/0049794 | A1 * | 3/2004 | Shao | H04L 12/2805 725/89 |
| 2004/0181810 | A1 * | 9/2004 | Pelkey | G11B 27/036 725/116 |
| 2006/0039357 | A1 * | 2/2006 | Kim | H04J 14/0226 370/352 |
| 2006/0195787 | A1 * | 8/2006 | Topiwala | G06Q 10/107 715/700 |
| 2007/0268874 | A1 | 11/2007 | Vare et al. | |
| 2009/0013363 | A1 * | 1/2009 | Lee | H04H 20/24 725/110 |
| 2012/0200666 | A1 * | 8/2012 | Suh | H04N 13/0029 348/42 |

FOREIGN PATENT DOCUMENTS

| | | | |
|---|---|---|---|
| EP | 2285024 | | 2/2011 |
| GB | 2345598 | A * | 11/1999 |
| GB | 2 345 598 | | 7/2000 |
| JP | 2011 061753 | A | 3/2011 |
| WO | WO 99/14874 | A1 | 3/1999 |
| WO | WO 01/22632 | A1 | 3/2001 |
| WO | WO 2009/122370 | A2 | 10/2009 |

OTHER PUBLICATIONS

European Search Report dated Jun. 25, 2014 for European Application No. 14167776, 4 pages.

European Search Report dated Nov. 11, 2013 for European Application No. GB1308376.1, in 3 pages.

* cited by examiner

DIGITAL RADIO RECEIVER SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field of the Application

The present application relates to a digital radio receiver system and method for switching from receiving a first broadcast service to an alternative broadcast service. The present invention also relates to a digital radio receiver system and method for scanning for broadcast services in a broadcast signal to generate an alternative broadcast service list for use in controlling the digital radio receiver system.

2. Description of the Related Art

When receiving broadcast services, such as OFDM broadcast services (for example DAB broadcast services), the receiver may occasionally lose the current signal being demodulated and decoded and need to select an alternative. Certain OFDM broadcast standards may provide signalling information to assist the receiver in identifying an alternative service.

For example, the DAB standard EN 300401 presents a mechanism of signalling ("Service Linking") information to allow services to be conceptually linked together—either as "hard links" where the service content is identical, or as "soft links" where the services share some other relationship (most likely from the same broadcaster).

Service Following uses Service Linking information to maintain continuity of content. DAB standard TS 103 176 describes Service Following as "the term applied to maintaining the same audio or data content that the user has selected in spite of the varying reception conditions that occur". It states that service following "provides information to allow precisely the same service to be followed".

It is desirable by the user (and thus commercially advantageous to the manufacturer) for the receiver to identify, select and start demodulating and decoding a suitable alternative service as swiftly as possible.

A known solution to this is to include two radio tuners in the radio receiver as shown in FIG. 1. A first tuner 1*a* and demodulator 2*a* receive and demodulate the original broadcast service selected by the user, whilst the second radio tuner 1*b* and demodulator 2*b* tunes to other frequencies to select a suitable alternative service. However, this is a costly solution, as there are two tuners and demodulators.

We have appreciated the need for an alternative cost-efficient receiver design employing a single-tuner and single demodulator that uses a variety of techniques to select a suitable alternative service swiftly.

SUMMARY

The present invention therefore provides a method of switching from receiving a first broadcast service to an alternative broadcast service in a digital radio receiver system, the method comprising the steps of: receiving, demodulating and decoding a first broadcast signal to output a first broadcast service, the broadcast signal comprising a plurality of frames, each frame comprising a plurality of time-interleaved channels, each channel comprising broadcast data associated with one or more broadcast services; detecting a level of deterioration in the first broadcast service that is greater than a threshold level of deterioration; selecting an alternative broadcast service from an alternative broadcast service list based on spectrum awareness data; controlling a tuner and/or demodulator and/or decoder of a digital radio receiver to switch to and receive, demodulate and decode the selected alternative broadcast service, wherein the alternative broadcast service list comprising data defining one or more broadcast services that are linked by a relationship to the first broadcast service, and wherein the spectrum awareness data defines one or more frequencies at which a broadcast signal is receivable by a receiver, the one or more frequencies of the spectrum awareness data being a filtered subset of the plurality of frequencies at which a broadcast signal is receivable.

Advantageously, by using spectrum awareness data, which comprises data defining one or more frequencies at which broadcast services may be receivable, faster selection of an alternative broadcast service from an alternative broadcast service list (which contains data relating to alternative broadcast services that are linked by a relationship to other broadcast services) is enabled. By using the spectrum awareness data, only entries that are considered valid (i.e. entries that are determined to be alternative services that the receiver may receive) are retrieved, which reduces the time taken for a receiver to switch to an alternative broadcast service from an initially received broadcast service.

The method may also comprise: detecting data identifying the received, demodulated and decoded alternative broadcast service; comparing the data identifying the received, demodulated and decoded alternative broadcast service with corresponding identifying data in the alternative broadcast service list associated with the selected alternative broadcast service; and storing data associated with the selected alternative broadcast service in a blacklist if the data identifying the received, demodulated and decoded alternative broadcast service is not the same as the identifying data in the alternative broadcast service list associated with the selected alternative broadcast service. Such a method enables erroneous entries to be removed, thereby saving time by preventing the receiver tuning to receive such an alternative broadcast in the future.

The method may comprise: selecting a second alternative broadcast service from the alternative broadcast service list based on the spectrum awareness data; and controlling a tuner and/or demodulator and/or decoder of a digital radio receiver to switch to and receive, demodulate and decode the selected second alternative broadcast service. If the first chosen alternative broadcast service is unavailable, the method chooses a further alternative broadcast service in order to deliver some service to the user.

The method may further comprise generating the alternative broadcast service list, which comprises: receiving, demodulating and decoding a service information channel in one or more frames of the broadcast signal, the service information channel comprising data defining alternative broadcast services associated with the broadcast signal; storing the decoded data from the service information channel in the alternative broadcast service list.

The method may comprise generating the alternative broadcast service list using a broadcast signal at a different frequency during reception of a broadcast signal at an initial frequency, comprising: receiving, demodulating and decoding a service information channel of a first frame in a first broadcast signal at an initial frequency; controlling a tuner of a receiver to tune away from the initial frequency at which the first broadcast signal is being received to a different frequency, the different frequency being one of the other frequencies in the spectrum awareness data; receiving and demodulating a first frame of a second broadcast signal at the different frequency; decoding a service information channel in the first frame of the received broadcast signal at the different frequency, the service information channel comprising alternative broadcast service data for broadcast services for one or more frequencies; storing the decoded data from the service information channel at the different frequency in the alternative broadcast service list; and controlling the tuner to tune back to the initial frequency and receiving, demodulating and decoding a packet of broadcast data corresponding to a service information channel from a second received frame in the broadcast signal at the initial frequency.

Advantageously, this reduces the time taken to populate the alternative broadcast service list, since the method utilises a time period during reception of a frame of a broadcast signal when unwanted broadcast data is being received in order to seek further broadcast service data on other frequencies.

The first and second received frames in the broadcast signal at the initial frequency may be consecutive frames in the received broadcast signal.

The data comprising the alternative broadcast service list may be ranked in order of priority based on the spectrum awareness data. Furthermore, the data comprising the alternative broadcast service list may also comprise location data, the location data defining a location of the region of transmission of the broadcast services.

Where location data is stored, there may be a plurality of alternative broadcast service lists, each alternative broadcast service list corresponding with a respective different region of transmission of the broadcast services. The alternative broadcast service may therefore be selected from an alternative broadcast service list associated with a region.

By using location data, the search space may be reduced based on the location of the receiver i.e. only frequencies or broadcast signals associated with the location region of the receiver may be used to seek out alternative broadcast service data and to tune to for alternative broadcast services.

Where location data is stored, the method may comprise: comparing the location data with a location region of a digital radio receiver; and selecting an alternative broadcast service from the alternative broadcast service list based on the location data and the location region of the digital radio receiver.

The method may also comprise determining the location of a receiver using a filter to identify a motion vector of the digital radio receiver. The filter may be a Kalman filter used on the received broadcast signal.

The method may also comprise updating the spectrum awareness data during reception of a broadcast signal. Such a method comprises: receiving, demodulating and decoding a first frame in a first broadcast signal at an initial frequency; controlling the tuner to tune away from the initial frequency at which the broadcast signal is being received to a different frequency, the different frequency being one of a plurality of frequencies at which a broadcast signal is receivable; detecting a broadcast signal at the different frequency; storing data corresponding with the detected broadcast signal at the different frequency to update the spectrum awareness data; and controlling the tuner to tune back to the initial frequency and receiving, demodulating and decoding a second frame in the first broadcast signal.

Once again, the method utilises a time period during reception of a frame of a broadcast signal when unwanted broadcast data is being received in order to seek spectrum awareness data on other frequencies. Advantageously, this reduces the time taken to populate the spectrum awareness data.

The first and second received frames may be consecutive frames in the first received broadcast signal.

The data being stored in the spectrum awareness data may comprise at least data corresponding to a frequency at which a broadcast signal is detected.

Furthermore, the data being stored in the spectrum awareness data may comprise a priority value associated with a detected broadcast signal, and the method comprises assigning a higher priority value to a detected broadcast signal not already stored in the spectrum awareness data than a broadcast signal already stored in the spectrum awareness data. The method may also comprise incrementally reducing the priority value associated with a detected broadcast signal after the respective data for the detected broadcast signal has been in the spectrum awareness data for a first period of time. Furthermore, the method may also comprise removing data associated with a detected broadcast signal from the spectrum awareness data when the priority value for the respective detected broadcast signal falls below a threshold priority value.

In the method comprising the step of detecting a broadcast signal at the different frequency, the method may comprise determining the presence of a broadcast signal at the different frequency.

In a first aspect, determining the presence of a broadcast signal may comprise detecting a signal having a plurality of frames with substantially the same frame structure as a broadcast signal. In such a method, the broadcast signal comprises a plurality of symbols, each symbol comprising a guard frame comprising a cyclic prefix, and a data portion. The step of determining the presence of a broadcast signal may then comprise the steps of: receiving a plurality of samples at the respective frequency, the number of samples corresponding with the length of at least two symbols; performing a sliding correlation on the received plurality of samples to identify a peak of correlation between the samples, the sliding correlation occurring a number of samples apart corresponding with a number of samples in the data portion of a symbol; correcting a phase of the received samples using the identified peak in correlation to generate a phase corrected signal; performing a first correlation comprising correlating a plurality of samples from a first region of the phase corrected signal with a plurality of samples in a second region of the phase corrected signal; performing a second correlation comprising correlating a plurality of samples from a third region of the phase corrected signal with a plurality of samples in a fourth region of the phase corrected signal; detecting a broadcast signal in the plurality of samples from the broadcast receiver based on the first and second correlations.

The method utilises a property of the received broadcast signal in order to determine the likelihood that the detected signal is a signal containing a desired broadcast signal. For example, in digital radio receiver systems using OFDM (Orthogonal Frequency Division Multiplexing) schemes, such as DAB radio, each symbol has a known structure so that a measure of the correlations of various regions may be compared to give an indication of the confidence that the signal being received is am OFDM broadcast signal.

In a second aspect, determining the presence of a broadcast signal comprises determining the presence of a signal power indicating the presence of a broadcast signal at the respective frequency.

Furthermore, detecting a broadcast signal at the different frequency may comprise determining a quality metric of the broadcast signal at the different frequency.

The present invention also provides a digital radio receiver system for switching from receiving a first broadcast service to an alternative broadcast service, comprising: a tuner coupleable to an antenna for receiving broadcast signals, the broadcast signal comprising a plurality of frames, each frame comprising a plurality of time-interleaved channels, each channel comprising broadcast data associated with one or more broadcast services; a demodulator coupled to an output of the tuner for demodulating a received broadcast signal into one or more received frames; a decoder coupled to an output of the demodulator for decoding the received frames; and a controller coupled to the tuner, demodulator and controller, wherein the controller is configured to: receive, demodulate and decode a first broadcast signal to output a first broadcast service; detect a level of deterioration in the first broadcast service that is greater than a threshold level of deterioration; select an alternative broadcast service from an alternative broadcast service list based on spectrum awareness data; control the tuner and/or demodulator and/or decoder to switch to and receive, demodulate and decode the selected alternative broadcast service, wherein the alternative broadcast service list comprises data defining one or more broadcast services that are linked by a relationship to the first broadcast service, and wherein the alternative broadcast service list is filtered using spectrum awareness data, the spectrum awareness data defines one or more frequencies at which a broadcast signal is receivable by a receiver, the one or more frequencies of the spectrum awareness data being a filtered subset of the plurality of frequencies at which a broadcast signal is receivable.

Advantageously, by using spectrum awareness data, which comprises data defining one or more frequencies at which broadcast services may be receivable, faster selection of an alternative broadcast service from an alternative broadcast service list (which contains data relating to alternative broadcast services that are linked by a relationship to other broadcast services) is enabled. By using the spectrum awareness data, only entries that are considered valid (i.e. entries that are determined to be alternative services that the receiver may receive) are retrieved, which reduces the time taken for a receiver to switch to an alternative broadcast service from an initially received broadcast service.

The controller of the receiver system may be configured to: detect data identifying the received, demodulated and decoded alternative broadcast service; compare the data identifying the received, demodulated and decoded alternative broadcast service with corresponding identifying data in the alternative broadcast service list associated with the selected alternative broadcast service; and store data associated with the selected alternative broadcast service in a blacklist if the data identifying the received, demodulated and decoded alternative broadcast service is not the same as the identifying data in the alternative broadcast service list associated with the selected alternative broadcast service.

The controller may be configured to: select a second alternative broadcast service from the alternative broadcast service list based on the spectrum awareness data; and control the tuner and/or demodulator and/or decoder to switch to and receive, demodulate and decode the selected second alternative broadcast service.

The controller may be configured to generate the alternative broadcast service list by: receiving, demodulating and decoding a service information channel in one or more frames of the broadcast signal, the service information channel comprising data defining alternative broadcast services associated with the broadcast signal; storing the decoded data from the service information channel in the alternative broadcast service list.

Furthermore, the controller is configured to generate the alternative broadcast service list using a broadcast signal at a different frequency during reception of a broadcast signal at an initial frequency by: receiving, demodulating and decoding a service information channel of a first frame in a first broadcast signal at an initial frequency; controlling the tuner to tune away from the initial frequency at which the first broadcast signal is being received to a different frequency, the different frequency being one of the other frequencies in the spectrum awareness data; receiving and demodulating a first frame of a second broadcast signal at the different frequency; decoding a service information channel in the first frame of the received broadcast signal at the different frequency, the service information channel comprising alternative broadcast service data for broadcast services for one or more frequencies; storing the decoded data from the service information channel at the different frequency in the alternative broadcast service list; and controlling the tuner to tune back to the initial frequency and receiving, demodulating and decoding a packet of broadcast data corresponding to a service information channel from a second received frame in the broadcast signal at the initial frequency.

Advantageously, this reduces the time taken to populate the alternative broadcast service list, since the controller utilises a time period during reception of a frame of a broadcast signal when unwanted broadcast data is being received in order to seek further broadcast service data on other frequencies.

The first and second received frames in the broadcast signal at the initial frequency may be consecutive frames in the received broadcast signal.

The data comprising the alternative broadcast service list may be ranked in order of priority based on the spectrum awareness data. Furthermore, the data comprising the alternative broadcast service list may also comprise location data, the location data defining a location of the region of transmission of the broadcast services.

Where location data is stored, there may be a plurality of alternative broadcast service lists, each alternative broadcast service list corresponding with a respective different region of transmission of the broadcast services. The alternative broadcast service may therefore be selected from an alternative broadcast service list associated with a region.

By using location data, the search space may be reduced based on the location of the receiver i.e. only frequencies or broadcast signals associated with the location region of the receiver may be used to seek out alternative broadcast service data and to tune to for alternative broadcast services.

The controller may be configured to: compare the location data with a location region of a digital radio receiver; and select an alternative broadcast service from the alternative broadcast service list based on the location data and the location region of the digital radio receiver.

The controller may also be configured to determine the location of a receiver using a filter to identify a motion vector of the digital radio receiver. The filter may be a Kalman filter used on the received broadcast signal.

The controller may be configured to update the spectrum awareness data during reception of a broadcast signal. In such configurations, the controller may be configured to: control the tuner, demodulator and decoder to receive, demodulate and decode a first frame in a first broadcast signal at an initial frequency; control the tuner to tune away from the initial frequency at which the broadcast signal is being received to a different frequency, the different frequency being one of a plurality of frequencies at which a broadcast signal is receivable; detect a broadcast signal at the different frequency; store data corresponding with the detected broadcast signal at the different frequency to update the spectrum awareness data; and control the tuner to tune back to the initial frequency to receive, demodulate and decode a second frame in the first broadcast signal.

Once again, the method utilises a time period during reception of a frame of a broadcast signal when unwanted broadcast data is being received in order to seek spectrum awareness data on other frequencies. Advantageously, this reduces the time taken to populate the spectrum awareness data.

The first and second received frames may be consecutive frames in the first received broadcast signal.

The data being stored in the spectrum awareness data may comprise at least data corresponding to a frequency at which a broadcast signal is detected.

Furthermore, the data being stored in the spectrum awareness data may comprise a priority value associated with a detected broadcast signal, and the controller is configured to assign a higher priority value to a detected broadcast signal not already stored in the spectrum awareness data than a broadcast signal already stored in the spectrum awareness data. The controller may also incrementally reducing the priority value associated with a detected broadcast signal after the respective data for the detected broadcast signal has been in the spectrum awareness data for a first period of time. Furthermore, the controller may also remove data associated with a detected broadcast signal from the spectrum awareness data when the priority value for the respective detected broadcast signal falls below a threshold priority value.

When the controller is configured to detect a broadcast signal at the different frequency, the controller achieves this by determining the presence of a broadcast signal at the different frequency.

In a first aspect, the controller is configured to determine the presence of a broadcast signal by detecting a signal having a plurality of frames with substantially the same frame structure as a broadcast signal. In such an aspect, the broadcast signal comprises a plurality of symbols, each symbol comprising a guard frame comprising a cyclic prefix, and a data portion, and the controller is configured to determine the presence of a broadcast signal by: receiving a plurality of samples at the respective frequency, the number of samples corresponding with the length of at least two symbols; performing a sliding correlation on the received plurality of samples to identify a peak of correlation between the samples, the sliding correlation occurring a number of samples apart corresponding with a number of samples in the data portion of a symbol; correcting a phase of the received samples using the identified peak in correlation to generate a phase corrected signal; performing a first correlation comprising correlating a plurality of samples from a first region of the phase corrected signal with a plurality of samples in a second region of the phase corrected signal; performing a second correlation comprising correlating a plurality of samples from a third region of the phase corrected signal with a plurality of samples in a fourth region of the phase corrected signal; detecting a broadcast signal in the plurality of samples from the broadcast receiver based on the first and second correlations.

The method utilises a property of the received broadcast signal in order to determine the likelihood that the detected signal is a signal containing a desired broadcast signal. For example, in digital radio receiver systems using OFDM (Orthogonal Frequency Division Multiplexing) schemes, such as DAB radio, each symbol has a known structure so that a measure of the correlations of various regions may be compared to give an indication of the confidence that the signal being received is am OFDM broadcast signal.

In a second aspect, the controller may be configured to determine the presence of a broadcast signal by determining the presence of a signal power indicating the presence of a broadcast signal at the respective frequency.

Furthermore, when detecting a broadcast signal at the different frequency, the controller may determine a quality metric of the broadcast signal at the different frequency.

In any of the above-described methods and systems, the data defining one or more frequencies at which a broadcast signal is receivable by a receiver in the spectrum awareness data is a filtered subset of a plurality of frequencies in a total reception bandwidth of a digital radio receiver system.

In any of the above-described methods and systems, the received broadcast signal is a DAB signal, and the service information channel is a Fast Information Channel in the received DAB signal.

In any of the above-described methods and systems, the relationship between the first broadcast service and the alternative broadcast service is defined by a hard link or a soft link.

DETAILED DESCRIPTION

In brief, the invention utilises spectrum awareness data, which comprises data defining one or more frequencies at which broadcast services may be receivable, in order to enable faster selection of an alternative broadcast service from an alternative broadcast service list containing data relating to alternative broadcast services that are linked by a relationship to other broadcast services. By using the spectrum awareness data, only entries that are considered valid (i.e. entries that are determined to be alternative services that the receiver may receive) are retrieved, which reduces the time taken for a receiver to switch to an alternative broadcast service from an initially received broadcast service.

For example, in prior art solutions, all alternative broadcast service data extracted from a broadcast signal are stored in an alternative broadcast service, and all alternative broadcast service data, which includes services that may not be available to the receiver (for example at frequencies not being used in the region of the receiver, or in broadcast signals that cannot be received properly by a receiver due to interference), are retrieved for use in finding an alternative broadcast service. This slows down the switching process (from a broadcast service to an alternative broadcast service), since the receiver may be tuned to a broadcast service that is not actually receivable due to location or interference.

The invention aims to provide a digital radio receiver and method for selecting a suitable alternative service ("reselection") whilst minimizing the time period without signal for a single-tuner system.

Figure 1:
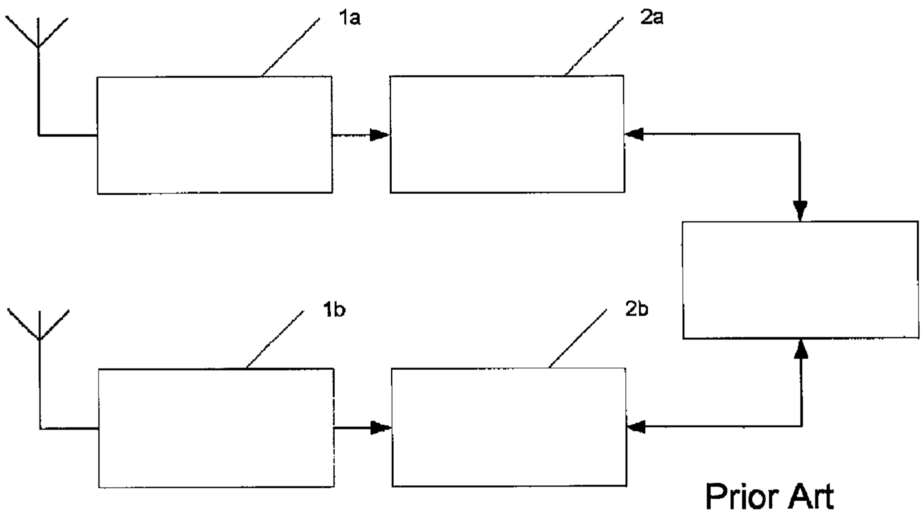
FIG. 1 shows part of a prior art digital radio receiver comprising multiple tuners.
Figure 2:
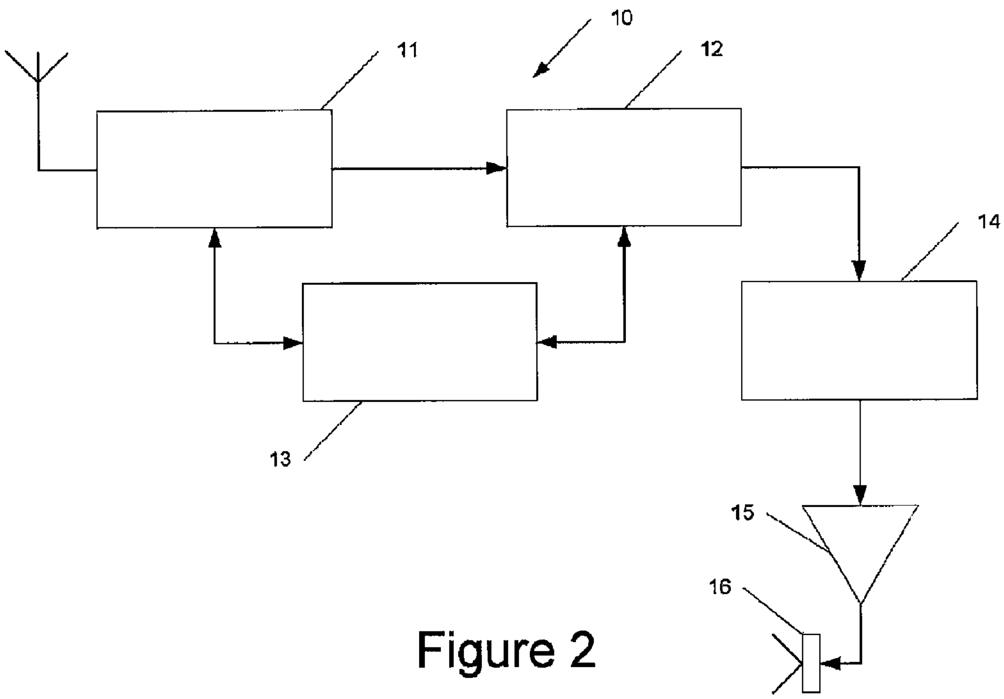
FIG. 2 shows a digital radio receiver according to the present invention.

FIG. 2 shows a simplified system diagram for a receiver 10 according to the present invention. A tuner 11 receives broadcast signals from an antenna and passes the signals to a demodulator 12 and decoder 14. In digital radio receiver systems, for example DAB, the broadcast signal comprising a plurality of OFDM frames, where each frame comprises a plurality of time-interleaved channels associated with one or more broadcast services. A controller 13 is coupled to the tuner for controlling the tuning frequency of the tuner. The controller 13 is also coupled to the demodulator 12 and/or decoder 14 for controller which broadcast service to demodulate and decode from the received broadcast signal. If the demodulated and decoded signal comprises an audio component, the audio component is passed to a power amplifier 15 and a loudspeaker 16.

During normal use, the user decides to select a service. The controller will control the tuner to select the correct frequency, and (in the case of audio components) the demodulator, decoder, power amplifier and loudspeaker device will deliver the broadcast service to the user.

If the currently selected service proves temporarily unsuitable—for example, because of complete signal loss or partial signal loss (i.e., experiencing high error rate which may cause audio distortion and other audio artefacts), the digital radio receiver will attempt to identify and select a suitable alternative service. This process will be discussed below.

Figure 3:
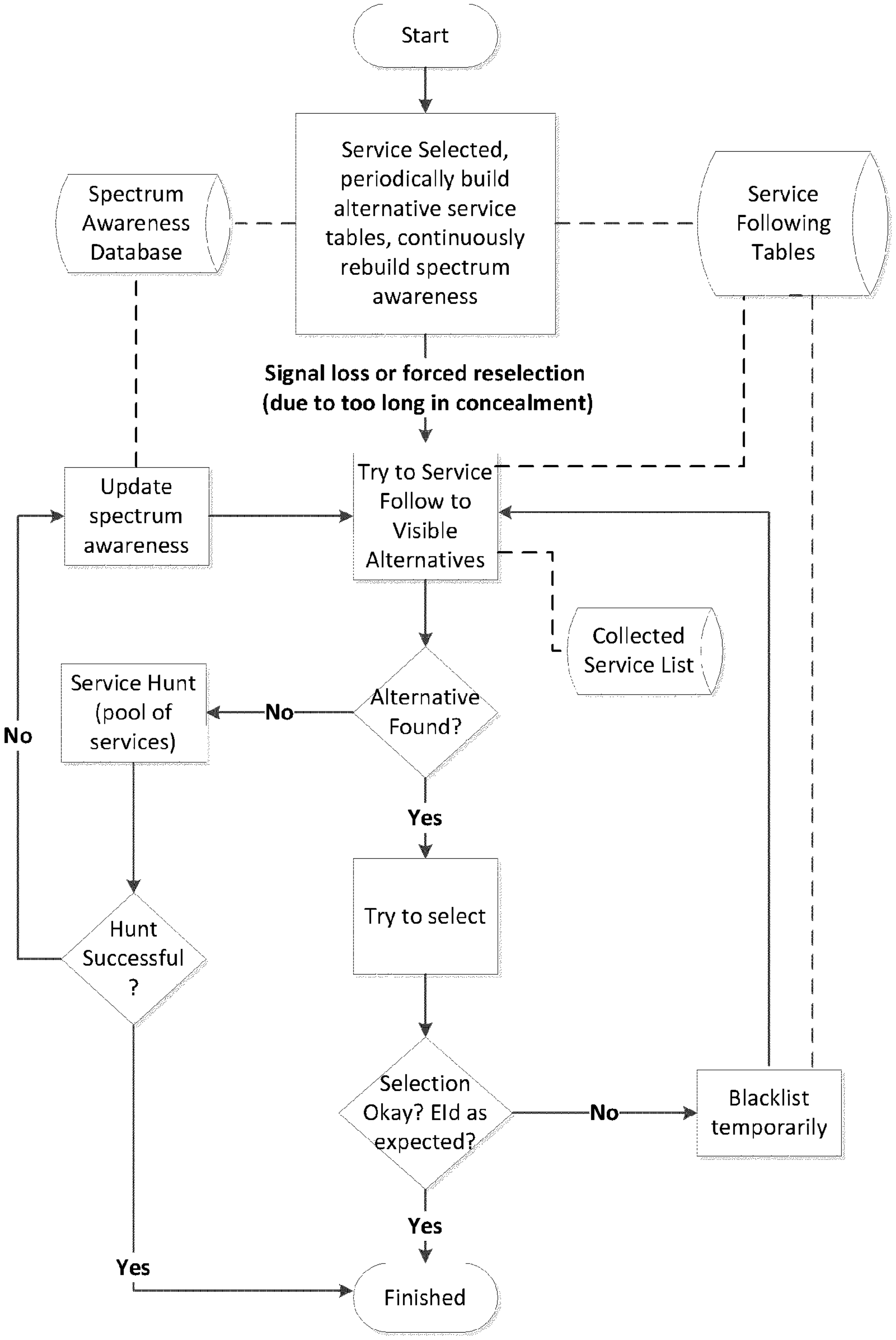
FIG. 3 shows a flowchart of the operation of the digital radio receiver system.

An overall flowchart of the operation of the digital radio receiver system is provided in FIG. 3. The operation can be broken down into three main processes: (i) Switching to receive alternative broadcast signals in the event of signal loss/degradation; (ii) Generating/updating the alternative broadcast service list; and (iii) Generating/updating spectrum awareness data.

(i) Switching To Receive Alternative Broadcast Signals

During normal use, the receiver system receives, demodulates and decodes a broadcast signal to output a selected broadcast service. The controller is configured to determine a quality metric associated with the quality of reception of the received and decoded broadcast service. If the controller detects a deterioration in the quality of the received broadcast service that is greater than a threshold level of deterioration, the controller will try to select an alternative broadcast service from an alternative broadcast service list.

The alternative broadcast service list comprises data defining one or more broadcast services that are linked by a relationship to the first broadcast service. In a DAB system, the relationship, or service link, may be a hard or soft relationship, as discussed above.

Once an alternative broadcast service has been identified from the alternative broadcast service list, the controller controls the tuner and/or demodulator and/or decoder to switch to and receive, demodulate and decode the selected alternative broadcast service.

In order to improve the reselection process (i.e. to improve speed and reliability in switching to an alternative service), the digital radio receiver stores all of the alternative broadcast service data extracted from the broadcast signal, but only a filtered subset of the total alternative broadcast services identified in a service information channel in one or more broadcast signals is retrieved for use in switching the receiver to an alternative broadcast service. The alternative broadcast services retrieved from the list are filtered based on the spectrum awareness data, which defines one or more frequencies at which a broadcast signal is receivable by a receiver. The receiver system therefore filters only the alternative broadcast services that have been identified as being valid alternative broadcast services (i.e. being transmitted on frequencies, and in signals, visible to the receiver system).

Once the receiver has frequency information for an alternative service candidate, it needs to verify that the desired alternative service is actually receivable on that frequency. It does this by receiving and demodulating data identifying the alternative broadcast service from the signalling information on that frequency. If the data identifying the alternative broadcast service is not as expected (i.e. by comparing it with identifying data stored in the alternative broadcast service list—for example the Ensemble ID), or not present (in the event that the signal is no longer available at the selected frequency), the controller stores data associated with the selected alternative broadcast service in a blacklist. This blacklist contains known recent frequencies that are not carrying alternate broadcast services. In mobile receiver systems, the controller ages these blacklisted frequencies out of the black list on the assumption that the device is regularly moving and the environment is constantly changing.

The controller then tries to select another alternative broadcast service candidate from the alternative broadcast service list and controls the tuner and/or demodulator and/or decoder to switch to and receive, demodulate and decode the selected second alternative broadcast service.

(ii) Generating/Updating the Alternative Broadcast Service List

The receiver system decodes and maintains a persistent list of suitable candidate alternatives based on information that is explicitly signalled by the broadcaster, for example Service Linking data in the Fast Information Channel (FIC) of a received DAB OFDM broadcast signal. Additionally, the system identifies and persistently stores lists of suitable candidate alternatives that it discovers serendipitously (for example, based on matching service or DAB ensemble identifier information it collects through normal operation).

To generate the list, the receiver system receives, demodulates and decodes a service information channel in one or more frames of the broadcast signal (for the example the FIC, which contains data defining alternative broadcast services associated with the broadcast signal). The receiver system then stores this decoded data from the service information channel in the alternative broadcast service list.

In order to minimize the amount of processing by the receiver, and also the amount of working memory required to process the data when finding suitable alternative services, the receiver system employs a number of strategies.

Firstly, the data in the alternative broadcast service list are pruned or filtered using spectrum awareness data. As discussed above, the spectrum awareness data comprises data defining one or more frequencies at which broadcast services may be receivable (i.e. frequencies at which OFDM signal have been detected at some point in time). The controller compares the data comprising the alternative broadcast service list with the spectrum awareness data, and retrieves only the data from the alternative broadcast service list having associated valid data in the spectrum awareness data for a respective alternative broadcast service in the alternative broadcast service list.

This minimizes the amount of working memory required by reducing the number of candidates to be considered and additional optimizes the list of alternatives that need to be attempted as a suitable alternative service thereby minimizing time to successful reselection.

The data in the alternative broadcast service list are ranked (for the purposes of attempting an alternative selection) based on the spectrum awareness data (i.e. more recently discovered OFDM signals are ranked higher, for example by assigning a higher priority value, than those data already present in the spectrum awareness data). This puts a priority order on the alternative broadcast service search sequence.

The receiver system also includes a number of strategies to prune the search space. Transmitter location information, which is often present in a service information channel in the received broadcast signal, may be used to identify a location of a region of transmission of an alternative broadcast signal. This data may be stored in the alternative broadcast service list.

The controller, for example, may compare the location data in the alternative broadcast service list for an alternative broadcast service with a location region of the digital radio receiver, and delete data from the alternative broadcast service list when the digital radio receiver is not in the same location region as defined by the location data.

Also, using a filter that operates recursively on streams of noisy input data to produce a statistically optimal estimate of the underlying system state (for example, a Kalman filter) may provide a motion vector indicating the directionality of travel of the receiver system. With this motion vector, it is possible to further prune the alternative broadcast service list of candidates based on regional information signalling from the broadcaster.

In addition to maintaining a single list of alternative service component candidates, the receiver may maintain multiple lists (geographically organised "books") which it indexes into based on location data. These "books" are stored persistently on a storage device and windowed in to available RAM for access by the controller based on location information in order to further help prune the search space, both in terms of time and in memory required for processing.

Once candidate alternative services are identified and ranked based on spectrum awareness information, the system tunes to a particular frequency and checks it for alternatives. These alternatives may be checked serially or as a pool of appropriate alternative services that it has determined may be present on that frequency—either through serendipitously collected service list information, or via service following information transmitted by the broadcaster.

Whilst we have described the generation and updating of the alternative broadcast service list as an operation carried out during reception of a desired broadcast service, the present invention also enables the alternative broadcast service list to be efficiently generated and updated from alternative frequencies during reception and processing of broadcast service data at an initial frequency in such a manner as to accelerate subsequent alternative service selection.

In brief, the invention provides a receiver having a single tuner that can be tuned away from a first frequency, from which a first broadcast signal is being received, to a second frequency to detect alternative broadcast signals and tuned back to the first frequency to continue receiving the first broadcast signal without an interruption to the received broadcast data collection. This invention utilises the fact that not all broadcast data belonging to a service (known as Capacity Units ("CUs") in DAB terminology) within a received frame are required to be decoded in order to receive a desired broadcast service. As such, the tuner can be tuned away, detect alternative services and tuned back to the original frequency to continue receiving the first broadcast service without any perceivable break in the reception of the first broadcast service.

Figure 6:
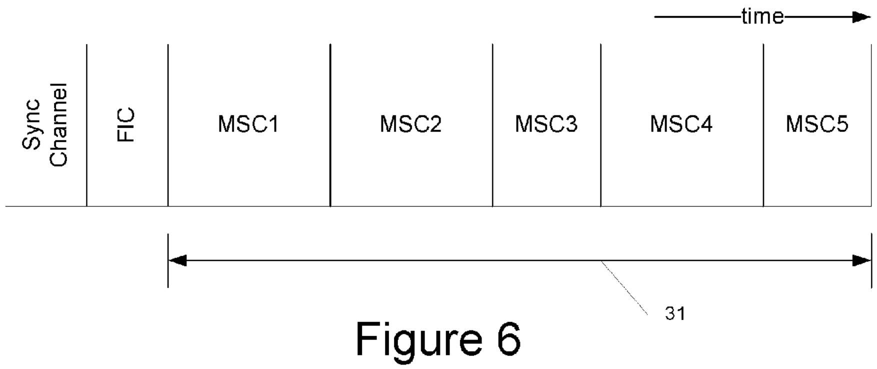
FIG. 6 shows the DAB frame structure.

FIG. 6 shows the DAB frame structure. It shows a Synchronisation Channel (which comprises NULL and Phase Reference Symbols), which the receiver needs to lock to the DAB signal, a Fast Information Channel (FIC) and a number of MSC (Main Service Channels) 31 in the main frame. The FIC channel comprises the desired broadcast service data used in generating the broadcast service list. In DAB, the FIC is three symbols long.

Only the Synchronisation and Fast Information Channels are required to generate the alternative broadcast service list, so the tuner may actually tune away from the current frequency to a different frequency during the remaining period of the current frame in order to update or filter the alternative broadcast service list using a different broadcast signal at a different frequency. The tuner may than be tuned back to the initial frequency in order to receive the Synchronisation and Fast Information Channels from the subsequent frame (which may be the next frame, or a later frame).

Figure 7:
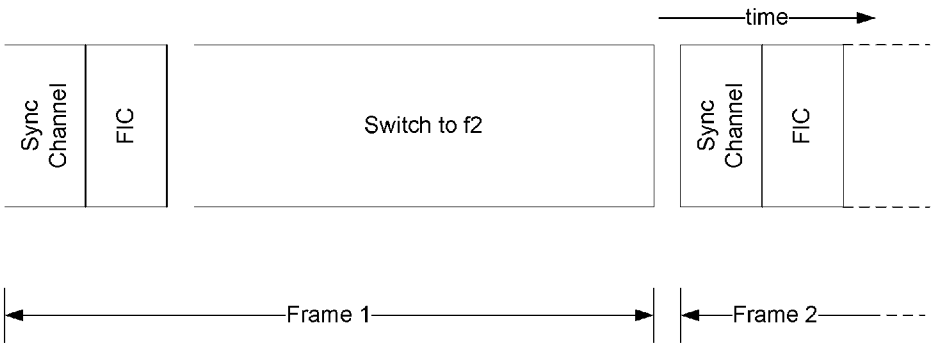
FIG. 7 shows the DAB frame structure as seen by the receiver system of FIG. 2.

FIG. 7 shows a DAB frame structure as seen by the receiver system using this method.

In its purist form (i.e. assuming that the alternative broadcast service list is being generated whilst not decoding any of the MSC portions), the other packets (MCS 1 to 5) are not required. In such a scenario, the controller switches the tuner to another frequency (in this example, f2) in the time when packets relating to MSC1 to 5 are being broadcast. The controller then switches the tuner back to f1 in time to receive the Synchronisation and Fast Information Channels in the next frame. As such, the controller may continue to receive broadcast service data relating to the current frequency of interest.

During the period when the tuner is switched to the second frequency, the controller uses this period to generate or update the alternative broadcast service list from the alternative frequency as described above.

In the situation where a user is listening to or consuming a broadcast service associated with the data in one or more of MSC 1 to 5, the controller tunes away from and back to the first frequency during the period when the unwanted MSC portions are being received. For example, if the user is listening to a service associated with MSC 1, then the controller tunes the tuner away from the first frequency, receives and demodulates and decodes data at the second frequency and then tunes back to the first frequency during MSC 2 to 5.

In this example, the controller tunes the tuner to one frequency in the same frame. In some embodiments, the controller may tune to more than one different frequency within the same frame, given there is sufficient time to do so within the same frame.

As well as using the spectrum awareness data to prune the search space, there is the chance that DAB service linking information is not being broadcast, or has not yet been received by the receiver. To avoid these situations, the system of the present invention interleaves periods of DAB service following with periods of accelerated scanning specifically for the purpose of selecting one of specific pool of appropriate DAB services ("service hunting").

(iii) Generating/Updating Spectrum Awareness Data

The controller is periodically looking to collect information about the probability/confidence of OFDM broadcast signals being present on various frequencies ("spectrum awareness of OFDM broadcast services"). This is the spectrum awareness data.

In the generation of the spectrum awareness data, each frequency within the current band is visited one or more times to refine the confidence estimation (i.e. confidence of there being a valid OFDM signal at a respective frequency). For each frequency visited (by the controller tuning the tuner to that frequency), the controller determines whether or not a broadcast signal is present at that frequency. For each instance of a broadcast signal being present, data associated with that frequency is stored in the spectrum awareness data. The data comprises at least an indication of the frequency so that the controller can use this data when it is required to filter the alternative broadcast service list.

The above scanning for spectrum awareness data may be performed in a pre-scan, that is prior to any broadcast services being presented to the user. The spectrum awareness data may also be generated/updated during reception of a desired broadcast service.

In the situation where the spectrum awareness data is generated and updated during reception of a desired broadcast service, this may be performed using the same technique described above with reference to FIGS. 6 and 7. That is, the tuner is tuned away from a first frequency to a second frequency to determine whether or not a broadcast signal is present at the second frequency. The tuner is then tuned back to the first frequency to continue receiving the desired broadcast service. This process occurs during reception of unwanted MSC portions.

As well as data associated with the frequency at which a broadcast signal is detected, the controller stores a priority value or weighted metric associated with that particular data. For each new frequency not already in the spectrum awareness data, a higher weighting or priority value is assigned than one of an entry already present in the spectrum awareness data. Those already in the spectrum awareness data are aged over a period of time (i.e. the priority value is decreased after a period of time). Those entries having a priority value below a threshold value are removed from the spectrum awareness data.

There are various techniques that may be used to determine whether or not a broadcast signal (for example an OFDM DAB signal) is present at a particular frequency for storing in the spectrum awareness data.

A first technique, based on our previous application GB 1206363.2, utilises the structure of an OFDM symbol to quickly determine how likely a received signal is to be an OFDM signal, and how likely it is not to be an OFDM signal. During a scanning operation these metrics allow a receiver to make a quick assessment on whether to store the data in the spectrum awareness data or to skip over a frequency.

In essence, the method does not assume the signal is an OFDM signal, but checks how likely or how unlikely that a signal has the correct OFDM structure. The concept is to utilise the property of the OFDM symbol in that it contains highly correlated and highly uncorrelated portions. In an OFDM symbol the guard interval and the tail end of the symbol will correlate with each other. The rest of the symbol can be considered to be white noise and thus does not correlate.

Figure 5:
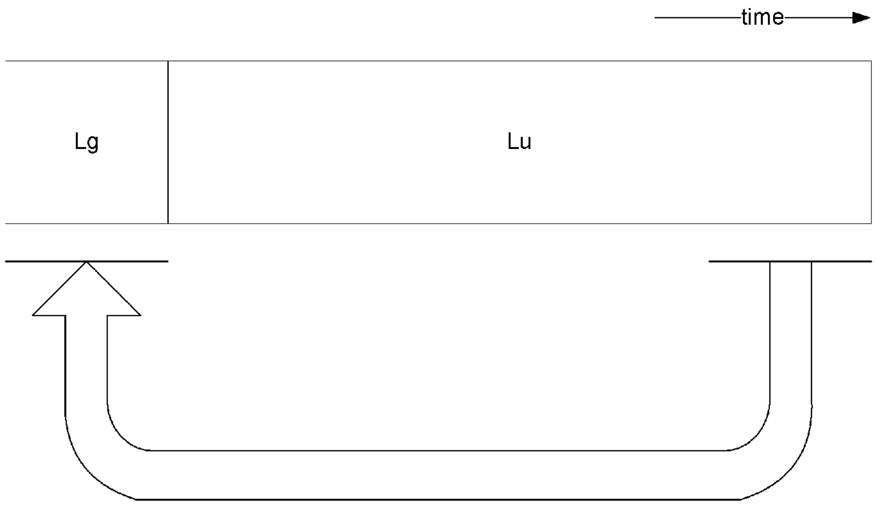
FIG. 5 shows the basic structure of a broadcast OFDM symbol.

FIG. 5 shows the basic structure of a broadcast OFDM symbol. The symbol comprises a guard interval or region, which is Lg samples long, and a data region, which is Lu samples long. In OFDM transmission, the guard interval is copy of the latter part of the data region. The guard interval is also known as a cyclic prefix, and advantageously enables receivers to overcome problems associated with received interference.

In this method, the determination of the likelihood of the received signal being an OFDM signal may be made using as few as two symbols' worth of samples, which may be captured without any time/frequency or equalisation processing.

In a second method of determining the presence of a broadcast signal, the controller monitors the received power at the desired frequency. If the received signal strength is greater than the expected noise power and/or greater than a threshold, it is assumed that there may be a broadcast signal at that frequency, and the data is stored in the spectrum awareness data. If it is later found that there is no broadcast data at this frequency, the data is removed from the spectrum awareness data.

Figure 4:
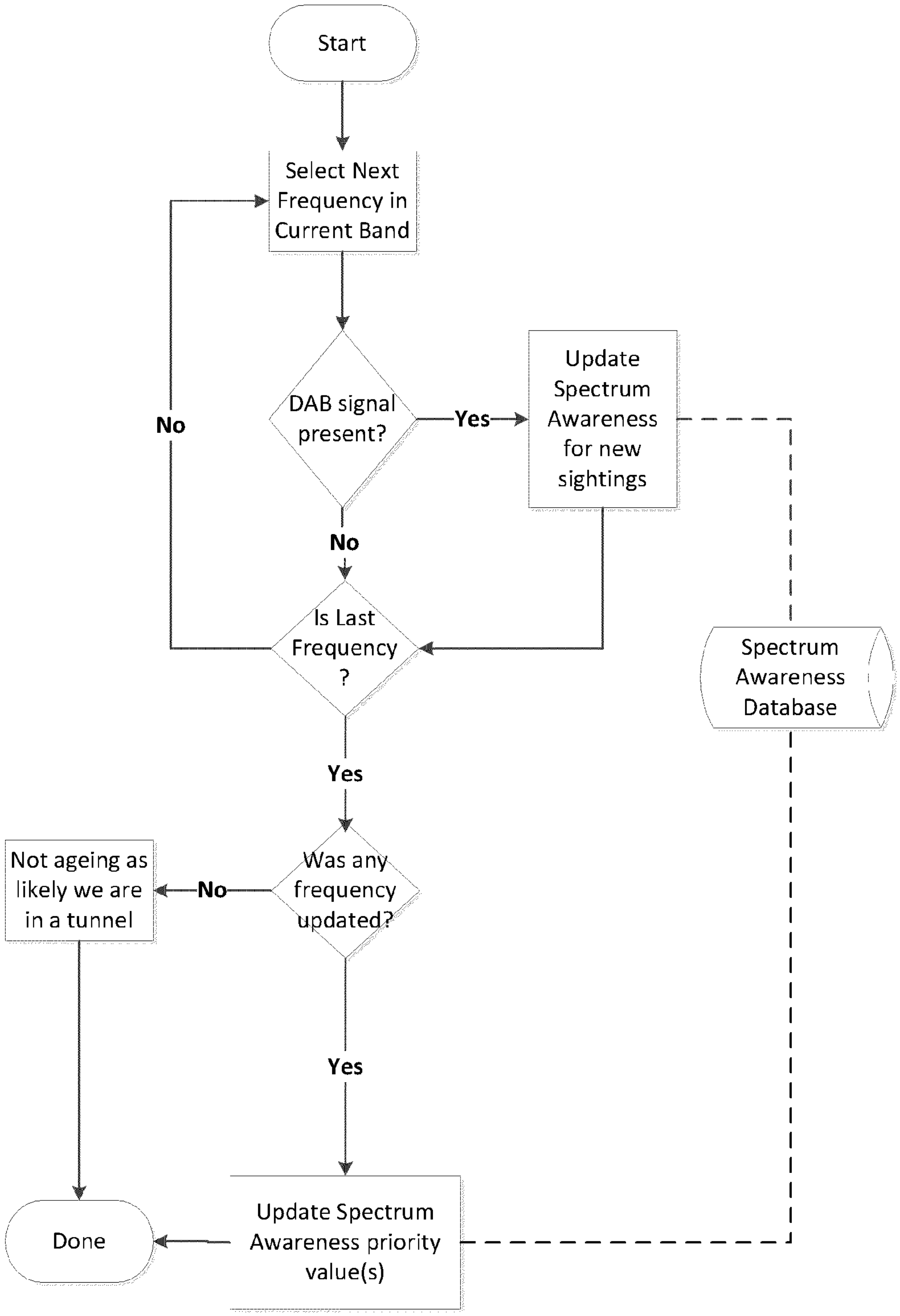
FIG. 4 shows a flowchart relating to the spectrum awareness data.

As the system continues to search for a suitable alternative candidate service, the spectrum awareness data will gradually become less relevant over time. To address this, the system of the current invention applies an ageing curve to previously discovered spectrum awareness data in order to degrade its validity. It additionally periodically interleaves periods where it refreshes spectrum awareness data with period of searching for suitable alternative service candidates. In order to reduce the amount of time required, it partially refreshes spectrum awareness data before retrying to select an alternative service based on its best current information. This is illustrated in FIG. 4.

The system supports suspension of ageing spectrum awareness once it detects that all frequencies appear to be attenuated (for example, through entering a tunnel)—this facilitates quick recovery to identifying alternative candidate services upon recovery of frequencies (for example, upon exiting a tunnel). This is illustrated in a flowchart in FIG. 4.

To further reduce the amount of time without a suitable selected alternative service, the system prioritises updating spectrum awareness for the more recently selected alternative service and the originally selected broadcast service. The receiver system optionally prioritises frequencies which most recently contained possible candidate alternatives (based on the spectrum awareness data).

The receiver system employs techniques based on forcing early reselection of an alternative service component triggered by loss of audio (for example, due to a failure to demodulate and decode audio—partially or completely, dependent on a threshold level).

The system utilises a split architecture where following of DAB to DAB service hard links is implemented autonomously in the embedded receiver, and DAB to DAB service soft link information is provided for host-side processing.

Through one or more of the variety of techniques described above, the receiver system is able to perform rapid reselection of an alternative service on a different ensemble/frequency on a single-tuner receiver design whilst maximizing performance for the user and minimize system cost.

Whilst we have described the method and receiver system comprising a receiver having only one tuner, the method and receiver system may utilise a second tuner. In such an embodiment, the second tuner may be used for the generation and updating of the spectrum awareness data, using the same methods as described above. Alternatively, the second tuner could be used to generate the spectrum awareness data through brute-force scanning (i.e. tuning to each of the frequencies and trying to receive, demodulate and decode whatever signal is there), although this is a less preferable solution since the second tuner would take longer to generate and update the spectrum awareness data than the preferred above-described methods.

Similarly, the second tuner may also be used to find or tune to receive alternative broadcast services. In such an embodiment, the second tuner could be tuned to receive the same broadcast from a different antennae or the most preferable alternative service in case the desired broadcast service is no longer receivable (loss of signal or reduced signal quality), which would enable a rapid switch-over to the alternative broadcast service (again selected from the alternative broadcast service list as described above), thereby reducing the time taken to present an alternative broadcast service to the user. In such an embodiment, the spectrum awareness data may be generated and updated as described above during the periods of unwanted data in the received frames of the alternative broadcast service being received. Furthermore, the primary and secondary tuners may be used to detect the alternative broadcast services in the received broadcast signals using the methods described above for input into the alternative broadcast service list. The use of multiple tuners in this manner enables faster population of the alternative broadcast service list.

A single tuner system is preferable due to cost considerations. However, it can be seen that there may be advantages (in particular the speed at which data is gathered and/or the speed at which alternative broadcast services are presented to the user) in using a multi-tuner receiver system when combined with the methods as described above.

Although the present invention has been described hereinabove with reference to specific embodiments, the present invention is not limited to the specific embodiments and modifications will be apparent to a skilled person in the art which lie within the scope of the present invention. Any of the embodiments described hereinabove can be used in any combination.

What is claimed is:

1. A method of switching from receiving a first broadcast service to an alternative broadcast service in a digital radio receiver system, the method comprising the steps of:

receiving, demodulating and decoding a first broadcast signal to output a first broadcast service, the first broadcast signal comprising a plurality of frames, each frame comprising a plurality of time-interleaved channels, each channel comprising broadcast data associated with one or more broadcast services;

detecting a level of deterioration in the first broadcast service that is greater than a threshold level of deterioration;

selecting an alternative broadcast service from an alternative broadcast service list based on spectrum awareness data, the spectrum awareness data defines one or more frequencies at which the first broadcast signal is receivable by a receiver, the one or more frequencies of the spectrum awareness data being a filtered subset of the plurality of frequencies at which the first broadcast signal is receivable, and the alternative broadcast service list comprising data defining one or more broadcast services that are linked by a relationship to the first broadcast service;

controlling a tuner and/or demodulator and/or decoder of a digital radio receiver to switch to and receive, demodulate and decode the selected alternative broadcast service; and updating the spectrum awareness data during reception of the first broadcast signal, without an interruption to the received broadcast data, by:

receiving, demodulating and decoding a first frame in the first broadcast signal at an initial frequency;

tuning the tuner to tune away from the initial frequency at which the first broadcast signal is being received to a different frequency, the different frequency being one of a plurality of frequencies at which the first broadcast signal is receivable;

detecting the first broadcast signal at the different frequency;

storing data corresponding with the detected first broadcast signal at the different frequency to update the spectrum awareness data; and tuning the tuner to tune back to the initial frequency and receiving, demodulating and decoding a second frame in the first broadcast signal, the first and second received frames being consecutive frames in the first received broadcast signal, wherein tuning the tuner to the different frequency, detecting the first broadcast signal at the different frequency, storing the data corresponding with the detected first broadcast signal at the different frequency, and tuning the tuner back to the initial frequency occurs during reception of a portion of the frame corresponding with broadcast data from unwanted broadcast services, such that there is no interruption to decoded desired broadcast data.

2. A method according to claim 1, comprising:

detecting data identifying the received, demodulated and decoded selected alternative broadcast service;

comparing the data identifying the received, demodulated and decoded selected alternative broadcast service with corresponding identifying data in the alternative broadcast service list associated with the selected alternative broadcast service; and storing data associated with the selected alternative broadcast service in a blacklist if the data identifying the received, demodulated and decoded alternative broadcast service is not the same as the identifying data in the alternative broadcast service list associated with the selected alternative broadcast service.

3. A method according to claim 2, comprising:

selecting a second alternative broadcast service from the alternative broadcast service list based on the spectrum awareness data; and controlling a tuner and/or demodulator and/or decoder of a digital radio receiver to switch to and receive, demodulate and decode the selected second alternative broadcast service.

4. A method according to claim 1, comprising generating the alternative broadcast service list, comprising:

receiving, demodulating and decoding a service information channel in one or more frames of the broadcast signal, the service information channel comprising data defining alternative broadcast services associated with the broadcast signal;

storing the decoded data from the service information channel in the alternative broadcast service list.

5. A method according to claim 1, comprising generating the alternative broadcast service list using a broadcast signal at a different frequency during reception of a broadcast signal at an initial frequency without an interruption to the received broadcast data, comprising:

receiving, demodulating and decoding a service information channel of a first frame in a first broadcast signal at an initial frequency;

controlling a tuner of a receiver to tune away from the initial frequency at which the first broadcast signal is being received to a different frequency, the different frequency being one of the other frequencies in the spectrum awareness data;

receiving and demodulating a first frame of a second broadcast signal at the different frequency;

decoding a service information channel in the first frame of the received broadcast signal at the different frequency, the service information channel comprising alternative broadcast service data for broadcast services for one or more frequencies;

storing the decoded data from the service information channel at the different frequency in the alternative broadcast service list; and controlling the tuner to tune back to the initial frequency and receiving, demodulating and decoding a packet of broadcast data corresponding to a service information channel from a second received frame in the broadcast signal at the initial frequency.

6. A method according to claim 5, wherein the first and second received frames in the broadcast signal at the initial frequency are consecutive frames in the received broadcast signal.

7. A method according to claim 1, wherein the data comprising the alternative broadcast service list are ranked in order of priority based on the spectrum awareness data.

8. A method according to claim 4, wherein the data comprising the alternative broadcast service list comprises location data, the location data defining a location of the region of transmission of the broadcast services.

9. A method according to claim 8, comprising a plurality of alternative broadcast service lists, each alternative broadcast service list corresponding with a respective different region of transmission of the broadcast services.

10. A method according to claim 9, wherein the alternative broadcast service is selected from an alternative broadcast service list associated with a region.

11. A method according to claim 8, comprising:

comparing the location data with a location region of a digital radio receiver; and selecting an alternative broadcast service from the alternative broadcast service list based on the location data and the location region of the digital radio receiver.

12. A method according to claim 11, comprising determining the location of a receiver using a filter to identify a motion vector of the digital radio receiver.

13. A method according to claim 12, wherein the filter is a Kalman filter used on the received broadcast signal.

14. A method according to claim 1, wherein the data being stored comprises at least data corresponding to a frequency at which a broadcast signal is detected.

15. A method according to claim 14, wherein the data being stored comprises a priority value associated with a detected broadcast signal, and the method comprises assigning a higher priority value to a detected broadcast signal not already stored in the spectrum awareness data than a broadcast signal already stored in the spectrum awareness data.

16. A method according to claim 15, comprising incrementally reducing the priority value associated with a detected broadcast signal after the respective data for the detected broadcast signal has been in the spectrum awareness data for a first period of time.

17. A method according to claim 15, comprising removing data associated with a detected broadcast signal from the spectrum awareness data when the priority value for the respective detected broadcast signal falls below a threshold priority value.

18. A method according to claim 1, wherein detecting a broadcast signal at the different frequency comprises determining the presence of a broadcast signal at the different frequency.

19. A method according to claim 18, wherein determining the presence of a broadcast signal comprises detecting a signal having a plurality of frames with substantially the same frame structure as a broadcast signal.

20. A method according to claim 19, wherein the broadcast signal comprises a plurality of symbols, each symbol comprising a guard frame comprising a cyclic prefix, and a data portion, the step of determining the presence of a broadcast signal comprising the steps of:

receiving a plurality of samples at the respective frequency, the number of samples corresponding with the length of at least two symbols;

performing a sliding correlation on the received plurality of samples to identify a peak of correlation between the samples, the sliding correlation occurring a number of samples apart corresponding with a number of samples in the data portion of a symbol;

correcting a phase of the received samples using the identified peak in correlation to generate a phase corrected signal;

performing a first correlation comprising correlating a plurality of samples from a first region of the phase corrected signal with a plurality of samples in a second region of the phase corrected signal;

performing a second correlation comprising correlating a plurality of samples from a third region of the phase corrected signal with a plurality of samples in a fourth region of the phase corrected signal;

detecting a broadcast signal in the plurality of samples from the broadcast receiver based on the first and second correlations.

21. A method according to claim 18, wherein determining the presence of a broadcast signal comprises determining the presence of a signal power indicating the presence of a broadcast signal at the respective frequency.

22. A method according to claim 1, wherein detecting a broadcast signal at the different frequency comprises determining a quality metric of the broadcast signal at the different frequency.

23. A digital radio receiver system for switching from receiving a first broadcast service to an alternative broadcast service, comprising:

a tuner coupleable to an antenna for receiving broadcast signals, the broadcast signal comprising a plurality of frames, each frame comprising a plurality of time-interleaved channels, each channel comprising broadcast data associated with one or more broadcast services;

a demodulator coupled to an output of the tuner for demodulating a received first broadcast signal into one or more received frames;

a decoder coupled to an output of the demodulator for decoding the received frames; and a controller coupled to the tuner, demodulator and controller, wherein the controller is configured to:

receive, demodulate and decode the first broadcast signal to output a first broadcast service;

detect a level of deterioration in the first broadcast service that is greater than a threshold level of deterioration;

select an alternative broadcast service from an alternative broadcast service list based on spectrum awareness data, the alternative broadcast service list comprising data defining one or more broadcast services that are linked by a relationship to the first broadcast service, and the alternative broadcast service list is filtered using spectrum awareness data, the spectrum awareness data defines one or more frequencies at which the first broadcast signal is receivable by a receiver, the one or more frequencies of the spectrum awareness data being a filtered subset of the plurality of frequencies at which the first broadcast signal is receivable;

control the tuner and/or demodulator and/or decoder to switch to and receive, demodulate and decode the selected alternative broadcast service; and update the spectrum awareness data during reception of the first broadcast signal without interruption to the received broadcast data by:

controlling the tuner, demodulator and decoder to receive, demodulate and decode a first frame in the first broadcast signal at an initial frequency;

control the tuner to tune away from the initial frequency at which the first broadcast signal is being received to a different frequency, the different frequency being one of a plurality of frequencies at which the first broadcast signal is receivable;

detect the first broadcast signal at the different frequency;

store data corresponding with the detected first broadcast signal at the different frequency to update the spectrum awareness data; and control the tuner to tune back to the initial frequency to receive, demodulate and decode a second frame in the first broadcast signal, the first and second received frames being consecutive frames in the first received broadcast signal, wherein controlling the tuner to tune to a different frequency, detecting the first broadcast signal at the different frequency, storing the data corresponding with the detected first broadcast signal at the different frequency, and controlling the tuner to tune back to the initial frequency occurs during reception of a portion of the frame corresponding with broadcast data from unwanted broadcast services, such that there is no interruption to decoded desired broadcast data.

24. A receiver system according to claim 23, wherein the controller is configured to:

detect data identifying the received, demodulated and decoded selected alternative broadcast service;

compare the data identifying the received, demodulated and decoded selected alternative broadcast service with corresponding identifying data in the alternative broadcast service list associated with the selected alternative broadcast service; and store data associated with the selected alternative broadcast service in a blacklist if the data identifying the received, demodulated and decoded selected alternative broadcast service is not the same as the identifying data in the alternative broadcast service list associated with the selected alternative broadcast service.

25. A receiver system according to claim 24, wherein the controller is configured to:

select a second alternative broadcast service from the alternative broadcast service list based on the spectrum awareness data; and control the tuner and/or demodulator and/or decoder to switch to and receive, demodulate and decode the selected second alternative broadcast service.

26. A receiver system according to claim 23, wherein the controller is configured to generate the alternative broadcast service list by:

receiving, demodulating and decoding a service information channel in one or more frames of the broadcast signal, the service information channel comprising data defining alternative broadcast services associated with the broadcast signal;

storing the decoded data from the service information channel in the alternative broadcast service list.

27. A receiver system according to claim 23, wherein the controller is configured to generate the alternative broadcast service list using a broadcast signal at a different frequency during reception of a broadcast signal at an initial frequency without interruption to the received broadcast data by:

receiving, demodulating and decoding a service information channel of a first frame in a first broadcast signal at an initial frequency;

controlling the tuner to tune away from the initial frequency at which the first broadcast signal is being received to a different frequency, the different frequency being one of the other frequencies in the spectrum awareness data;

receiving and demodulating a first frame of a second broadcast signal at the different frequency;

decoding a service information channel in the first frame of the received broadcast signal at the different frequency, the service information channel comprising alternative broadcast service data for broadcast services for one or more frequencies;

storing the decoded data from the service information channel at the different frequency in the alternative broadcast service list; and controlling the tuner to tune back to the initial frequency and receiving, demodulating and decoding a packet of broadcast data corresponding to a service information channel from a second received frame in the broadcast signal at the initial frequency.

28. A receiver system according to claim 27, wherein the first and second received frames in the broadcast signal at the initial frequency are consecutive frames in the received broadcast signal.

29. A receiver system according to claim 23, wherein the data comprising the alternative broadcast service list are ranked in order of priority based on the spectrum awareness data.

30. A receiver system according to claim 26, wherein the data comprising the alternative broadcast service list comprises location data, the location data defining a location of the region of transmission of the broadcast services.

31. A receiver system according to claim 30, comprising a plurality of alternative broadcast service lists, each alternative broadcast service list corresponding with a respective different region of transmission of the broadcast services.

32. A receiver system according to claim 31, wherein the alternative broadcast service is selected from an alternative broadcast service list associated with a region.

33. A receiver system according to claim 30, wherein the controller is configured to:

compare the location data with a location region of a digital radio receiver; and select an alternative broadcast service from the alternative broadcast service list based on the location data and the location region of the digital radio receiver.

34. A receiver system according to claim 33, wherein the controller is configured to determine the location of a receiver using a filter to identify a motion vector of the digital radio receiver.

35. A receiver system according to claim 34, wherein the filter is a Kalman filter used on the received broadcast signal.

36. A receiver system according to claim 23, wherein the data being stored comprises at least data corresponding to a frequency at which a broadcast signal is detected.

37. A receiver system according to claim 36, wherein the data being stored comprises a priority value associated with a detected broadcast signal, and the controller is configured to assigning a higher priority value to a detected broadcast signal not already stored in the spectrum awareness data than a broadcast signal already stored in the spectrum awareness data.

38. A receiver system according to claim 37, wherein the controller is configured to incrementally reduce the priority value associated with a detected broadcast signal after the respective data for the detected broadcast signal has been in the spectrum awareness data for a first period of time.

39. A receiver system according to claim 37, wherein the controller is configured to remove data associated with a detected broadcast signal from the spectrum awareness data when the priority value for the respective detected broadcast signal falls below a threshold priority value.

40. A receiver system according to claim 23, wherein the controller is configured to detect a broadcast signal at the different frequency by determining the presence of a broadcast signal at the different frequency.

41. A receiver system according to claim 40, wherein the controller is configured to determine the presence of a broadcast signal by detecting a signal having a plurality of frames with substantially the same frame structure as a broadcast signal.

42. A receiver system according to claim 40, wherein the broadcast signal comprises a plurality of symbols, each symbol comprising a guard frame comprising a cyclic prefix, and a data portion, and the controller is configured to determine the presence of a broadcast signal by:

receiving a plurality of samples at the respective frequency, the number of samples corresponding with the length of at least two symbols;

performing a sliding correlation on the received plurality of samples to identify a peak of correlation between the samples, the sliding correlation occurring a number of samples apart corresponding with a number of samples in the data portion of a symbol;

correcting a phase of the received samples using the identified peak in correlation to generate a phase corrected signal;

performing a first correlation comprising correlating a plurality of samples from a first region of the phase corrected signal with a plurality of samples in a second region of the phase corrected signal;

performing a second correlation comprising correlating a plurality of samples from a third region of the phase corrected signal with a plurality of samples in a fourth region of the phase corrected signal;

detecting a broadcast signal in the plurality of samples from the broadcast receiver based on the first and second correlations.

43. A receiver system according to claim 42, wherein the controller is configured to determine the presence of a broadcast signal by determining the presence of a signal power indicating the presence of a broadcast signal at the respective frequency.

44. A receiver system according to claim 23, wherein detecting a broadcast signal at the different frequency comprises determining a quality metric of the broadcast signal at the different frequency.

45. A method according to claim 1, wherein the received broadcast signal is a DAB signal, and the service information channel is a Fast Information Channel in the received DAB signal.

46. A system according to claim 23, wherein the received broadcast signal is a DAB signal, and the service information channel is a Fast Information Channel in the received DAB signal.

47. A method according to claim 1, wherein the relationship between the first broadcast service and the alternative broadcast service is defined by a hard link or a soft link.

48. A system according to claim 23, wherein the relationship between the first broadcast service and the alternative broadcast service is defined by a hard link or a soft link.

* * * * *